United States Patent [19]

Kinoshita

[11] Patent Number: 5,167,302
[45] Date of Patent: Dec. 1, 1992

[54] TRUCK HAVING VERTICALLY MOVABLE GOODS-RECEIVING PORTION

[75] Inventor: Soichiro Kinoshita, Moriyama, Japan

[73] Assignee: Daifuku Co., Ltd., Japan

[21] Appl. No.: 736,619

[22] Filed: Jul. 26, 1991

[30] Foreign Application Priority Data

| Sep. 7, 1990 | [JP] | Japan | 2-238155 |
| Sep. 7, 1990 | [JP] | Japan | 2-238158 |
| Sep. 7, 1990 | [JP] | Japan | 2-238159 |
| Sep. 7, 1990 | [JP] | Japan | 2-238160 |
| Feb. 1, 1991 | [JP] | Japan | 3-11352 |
| Feb. 1, 1991 | [JP] | Japan | 3-11353 |

[51] Int. Cl.$^5$ ............................................. B66B 9/20
[52] U.S. Cl. ................................. 187/9 R; 211/208; 108/136
[58] Field of Search ............... 187/95, 9 E, 9 R, 27; 211/41, 208; 312/71; 108/136

[56] References Cited

U.S. PATENT DOCUMENTS

| 3,635,173 | 1/1972 | Ruben | 108/136 |
| 4,070,072 | 1/1978 | Skaller | 108/136 |
| 4,356,892 | 11/1982 | Mossey | 108/136 |
| 4,563,121 | 11/1986 | Drews | 187/9 R |

Primary Examiner—Robert P. Olszewski
Assistant Examiner—Kenneth Noland
Attorney, Agent, or Firm—Barnes, Kisselle, Raisch, Choate, Whittemore & Hulbert

[57] ABSTRACT

In a truck having a vertically movable goods-receiving portion, a plurality of resilient elements are arranged between an upper beam interconnecting the upper end of a righthand post and the upper end of a lefthand post and lower frames for mounting the vertically movable portion. The lower ends of all the resilient elements are fixed to the lower frames. The upper ends of some of the resilient elements are fixed to the upper beam, and the upper ends of the remaining resilient elements are engageably and disengageably held.

7 Claims, 17 Drawing Sheets

TRUCK HAVING VERTICALLY MOVABLE GOODS-RECEIVING PORTION

FIELD OF THE INVENTION

The present invention relates to a truck having a vertically movable goods-receiving portion of the type which can hold goods constantly at a predetermined height so as to enable loading and unloading operation in a comfortable position, and a guide device for such a truck.

BACKGROUND OF THE INVENTION

Trucks of this type have been known. A typical example of such truck is an automatic vertically movable working truck disclosed in Japanese Utility Model Publication No. 54-16427. According to this prior art arrangement, the truck comprises a rectangular frame-shaped body, wheels carried by the body at four corners thereof, and a support structure extending upward from the rear end of the body. There is provided a bed for placement of goods which is vertically movable by being guided along the supporting structure, with a pair of chains arranged between the bed and the upper end of the supporting structure via stationary sprockets. Each chain is trained around a moving sprocket mounted on a hanger plate, and between the hanger plate and the body there are arranged a plurality of springs and a locking hydraulic cylinder.

According to this prior art arrangement, the bed is suspended through the intermediary of the springs and, therefore, when no goods are placed on the bed, the bed is lifted to a level adjacent the upper end of the supporting structure by the restoring force of the springs. When goods are placed on the bed, the hanger plate is moved upward against the contracting force of the springs under the tension applied to the chain, so that the bed is lowered in response to the load. Such movement is effected while the hydraulic cylinder is opened, and when the hydralulic cylinder is closed, the bed is caused to stop at its present position irrespective of the load.

According to the above described conventional arrangement, the upper ends and lower ends of the springs are fixed respectively to the hanger plate and the body. Therefore, the arrangement cannot make effective adaptations to changes in load. Where goods to be handled are always same in weight, there is no problem; but if lightweight goods are placed on a bed adapted to heavier goods by a larger spring constant of springs, the bed will not be sufficiently lowered by the lightweight goods. On the other hand, if heavier goods are placed on a bed adapted to lightweight goods by a small spring constant of springs, the bed will reach the lowermost position at a stroke and will remain in that position until the bed is relieved of a fair amount of the load. In either case, workers find inconvenience in the handling of goods. This inconvenience may be removed by changing the number of springs to be put in the operative condition, but this involves removal and remounting of the cover for the supporting structure, which is very troublesome. Another problem is that one will be at a loss how to deal with the springs put in the inoperative condition.

When such conventional type of truck is in operation, the number of springs in operative condition cannot be visually grasped, and the operator cannot easily know the suitable number of springs to be put in the operative condition for handling a given amount of the load.

Further, according to the prior art arrangement, the truck is subjected to forward or backward motion by a push or pull given at a handgrip disposed on the back of the supporting structure at an upper portion thereof. In either case, the rectangular body of the truck is an obstacle to the ambulation of an operator who is giving a push or pull at the heavy-laden truck. Another trouble is that when an operator is pulling the truck with his back facing the truck, his heel may become positioned under the rear edge of the body of the truck, with the result of the Achilles' tendon being damaged.

Guide devices for trucks of this type have also been known. A typical example is disclosed in Japanese Patent Publication No. 50-1062. In this publication there is described an arrangement comprising a pair of support structures mounted upright on a body having wheels, a pair of side plates, right and left, disposed in the support structures, and a bed for placement of goods which are guided upward and downward along the side plates through guide rollers. The guide rollers are mounted on guide plates integral with the bed, and include upper guide rollers abutting the rear surfaces of the side plates, lower guide rollers abutting the front surfaces of the side plates, and a pair of side guide rollers, upper and lower, abutting the inner surfaces of the side plates. Between the bed and the support structure there is disposed a lift mechanism comprising springs, rollers, and guide bars for guiding the bed upward and downward in response to the weight of the load.

In such arrangement of the conventional type, vertical movement of the bed is carried out while the bed is guided by the side plates via the guide rollers. Such prior art guide device requires a large number of rollers (eight in the embodiment shown) for vertically guiding the bed, and also guide plates for roller mounting.

SUMMARY OF THE INVENTION

It is a first object of the invention to provide a truck having a vertically movable goods-receiving portion wherein the number of resilient elements (springs) used in supporting the load to be handled can be simply and easily changed according to the change in the load, and wherein any resilient elements which are not used for supporting the load can be stored within a support member in an orderly manner.

It is a second object of the invention to provide a truck having a vertically movable goods-receiving portion wherein an engaging element for holding in active condition each resilient element used in supporting the load can be locked to an engaged position or a disengaged position as required.

It is a third object of the invention to provide a truck having a vertically movable goods-receiving portion which is so designed as to enable an operator to easily know a suitable combination of resilient elements according to the weight of the load to be handled and, conversely, to enable the operator to know the weight of the load from an optimum combination of resilient elements.

It is a fourth object of the invention to provide a truck having a vertically movable goods-receiving portion which can insure the safety of an operator even when the operator is pulling the truck while turning his back on the truck.

It is a fifth object of the invention to provide a guide device for a truck having a vertically movable goods-receiving portion in which the number of rollers can be reduced and the rollers can be mounted directly on a carriage.

In order to accomplish the first object, the truck having a vertically movable goods-receiving portion in accordance with the present invention comprises a support member mounted on a wheeled pedestal, a vertically movable carriage provided in the support member, a table mounted on the carriage, a plurality of resilient elements arranged between an upper portion of the support member and the carriage, the lower ends of said resilient elements being connected to the carriage, some of said resilient elements being connected at their upper ends to said support member, the remaining resilient elements being individually provided at their upper ends with cross pieces and engagement pieces positioned above the respective cross pieces, a holder portion provided on the top of the carriage for holding said cross pieces from below, and a plurality of engaging elements pivotally attached to said support member which are individually engageable with and disengageable from said engagement pieces.

In order to accomplish the second object, in the truck having a vertically movable goods-receiving portion according to the invention, one end of a control element for pivotally moving each of said engaging elements is exposed outside the support member, and there is provided a locking element or spring element for locking the engaging element to a position assumed by said engaging element after being pivotally moved.

According to such arrangement of the invention, the table is suspended through the intermediary of the resilient elements and, therefore, when no goods are placed on the table, the table is lifted up to the upper extremity of the support member under the restoring force of the resilient elements. When goods are placed on the table, the weight of the goods is applied through the carriage to the resilient elements so that the table is lowered in response to the load and counter to the elastic force of the resilient elements. In this case, those of the remaining resilient elements which are in their operative position have their engagement portions engaged by engaging elements, and those which are in their non-operative position remain disengaged from engaging elements, with their respective cross pieces being supported from below by the holder portion, the resilient elements being thus carried by the carriage. When heavier goods are to be handled, the table is emptied and is elevated integrally with the carriage until the engagement portions of those resilient elements which are in non-operative position are positioned in corresponding relation to the complementary engaging elements, and then the engaging elements are pivoted against the biasing force of the associated positioning locking elements or springs to engage respective upper ends of the resilient elements. Then, the engaging elements are locked to their engaging position by the locking elements or springs, whereby operating resilient elements can be increased in number. When lightweight goods are to be handled, the above described procedure should be reversed to decrease the number of operating resilient elements.

In order to accomplish the third object, the truck having a vertically movable goods-receiving portion according to the invention further comprises an engagement marker formed on the one end of the control element which is exposed outside the support member, a reference member relative to the engagement marker, and a positioning element for securing each of the locking elements to the operative or inoperative position. The weight of the load can be recognized by the number of springs which have been put in the operative condition.

In order to accomplish the fourth object, the truck having a vertically movable goods-receiving portion according to the invention comprises a pedestal including a pair of side frames, right and left, having front and rear wheels, and a transverse frame interconnecting the side frames at intermediate points nearer to the rear ends thereof, a support member mounted upright on the transverse frame which extends transversely between the outer edges of the side frames, a carriage disposed at the front side of and vertically movable along the support member, a table mounted to the carriage, and a handgrip provided on the upper portion of the rear surface of the support member.

According to such arrangement, the pedestal is ichnographically H-shaped so as to have such a recess in the rear that the toe of an operator who is pushing the truck or the heel of an operator who is pulling the truck with his hands behind his back can be kept from tripping against the rear edge of the transverse frame.

In order to accomplish the fifth object, according to the invention there is also provided a guide device for a truck having a vertically movable goods-receiving portion comprising a support member mounted on a wheeled pedestal, a vertically movable carriage disposed at the front side of the support member, a table mounted on the carriage, an upward biasing device arranged between the support member and the carriage, the support member including a pair of posts, right and left, the posts being formed in opposed inner surfaces thereof with guide grooves, the guide grooves being each slanted to form inwardly converging inclined surfaces, guide rollers, upper and lower, disposed in spaced relation at opposite outer sides of the carriage and adapted to fit in the guide grooves, the outer circumferential edges of the guide rollers being abuttable on the inclined surfaces.

According to such arrangement, the table is moved upward and downward while being guided by the posts because the guide rollers are fitted in the guide grooves. In this case, the table is guided in such condition that it is properly positioned at both front and rear sides because the guide rollers are guided along the front and rear surfaces defining the guide grooves and, in addition, the table is guided in such condition that it is properly positioned at both right and left sides (or in the transverse direction) because the outer circumferential edges of the guide rollers abut the inclined surfaces.

PREFERRED EMBODIMENTS

Figure 1:
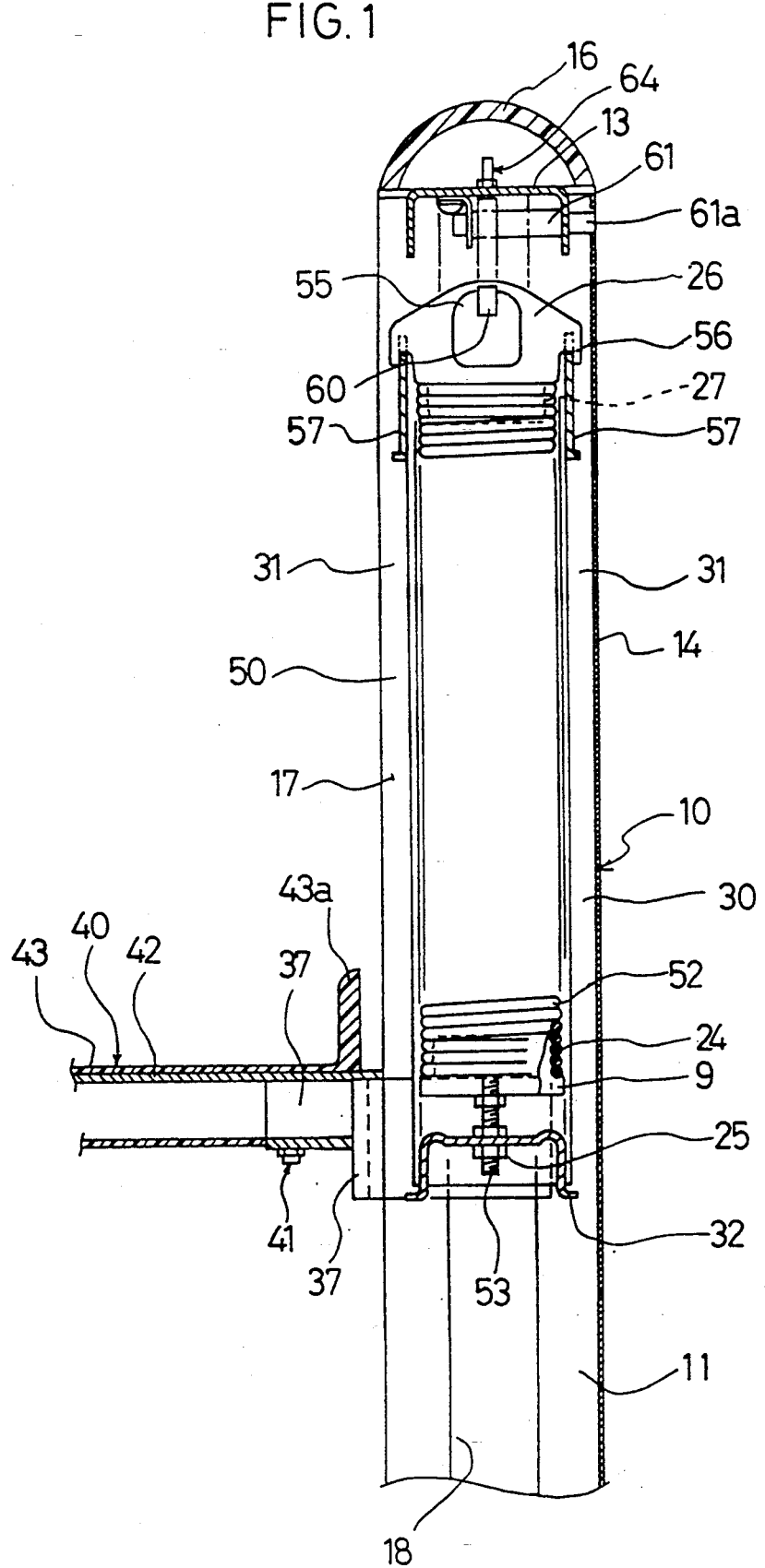
FIG. 1 is a vertical sectional view in side elevation of an upward biasing device.

One embodiment of the invention will now be described with reference to the accompanying drawings.

In FIGS. 3 to 6, reference numeral 1 designates a pedestal having a pair of side frames 1A, right and left, and a transverse frame 1B interconnecting the side frames 1A at intermediate points nearer to the rear ends thereof, by which the pedestal is configured into an H shape, with recesses 1C and 1D thus defined at opposite sides of the transverse frame 1B. Front wheels 3 are attached through fixing brackets 2 to the underside of the two side frames 1A at respective front ends thereof, and rear wheels 5 are attached through pivot brackets 4 to the underside of the side frames 1A at respective rear ends thereof. A reinforcing member 6 is mounted in each of the two side frames 1A, and corner members 8 made of a synthetic resin are attached to the front and rear ends of each side frame 1A.

Mounted on the transverse frame 1B is a support member 10 having a breadth almost corresponding to the distance between the two side frames 1A. The support member 10 comprises a pair of posts 11, right and left, upstanding from the two side frames 1A, a lower beam 12 interconnecting the lower ends of the posts 11, an upper beam 13 interconnecting the upper ends of the posts 11, a back panel 14 disposed at the back side of, and covering the space defined by, the posts 11 and beams 12, 13, a front panel 15 disposed at the front side of, and covering the space defined by, the beams 12, 13, and a top resin cover 16 extending between the upper ends of the two posts and over the upper surface of the upper beam 13.

The transverse frame 1B and the lower beam 12 are removably connected together by a plurality of locking elements (such as bolts) 7. Between each side edge of the front panel 15 and the post 11 adjacent thereto is formed a vertically extending slit 17. The two posts 11 are in the form of aluminum rails and are formed in their opposed interior surfaces with guide grooves 18 extending along the entire length of the posts. Each of the guide grooves 18 is defined by a pair of guide faces 19, 20, front and rear, which are slanted in a midportion thereof inwardly (depthwise) with respect to the groove to form inwardly converging inclined surfaces 19a, 20a (see FIG. 7). The support member 10 has a handgrip 21 provided on the upper portion of its rear surface. The handgrip 21 comprises a pair of brackets 22, right and left, fixed to the posts 11 at the rear side thereof and extending rearward, and a transversely extending pipe element 23 mounted between free ends of the brackets 22.

As FIGS. 1 to 6 show, a vertically movable carriage 30 is disposed within the support member 10. The carriage 30 comprises a pair of side frames 31, right and left, a lower frame 32 interconnecting the lower ends of the side frames 31, upper guide rollers 34 mounted on roller pins 33 or the like secured to the exterior of the pair of side frames 31 at the upper portions thereof, lower guide rollers 36 mounted on roller pins 35 or the like secured to the exterior of the side frames 31 at the lower portions thereof, and connecting members 37 extending forward of respective lower portions of the side frames 31. The guide rollers 34, 36 are made of a resin material and adapted to fit in the respective guide grooves 18 of the two posts 11 so as to be guided for upward and downward movement along the guide grooves 18, for which purpose the outer circumferential edges of the guide rollers 34, 36 are formed into arcuate surfaces 34a, 36a abuttable against the inclined surfaces 19a, 20a. The connecting members 37 project outwardly from the front of the support member 10 passing through the slits 17 so that they are vertically movable on the front side of the support member 10.

A table 40 is disposed in front of the support member 10, the table 40 being fixed to the connecting members 37 by means of coupling elements 41. The table 40 comprises a reinforcing member 42 which is U-shaped when viewed in plan, and a rectangular resin plate 43 disposed in such a fashion as to cover the reinforcing member 42. The table 40 is fixed to the connecting members 37 via free ends of the reinforcing member 42. The resin plate 43 has a reinforcing ribbed portion integrally formed in a grid pattern on its underside, and is further formed with an integral stopper portion 43a uprising from its rear end.

Figure 7:
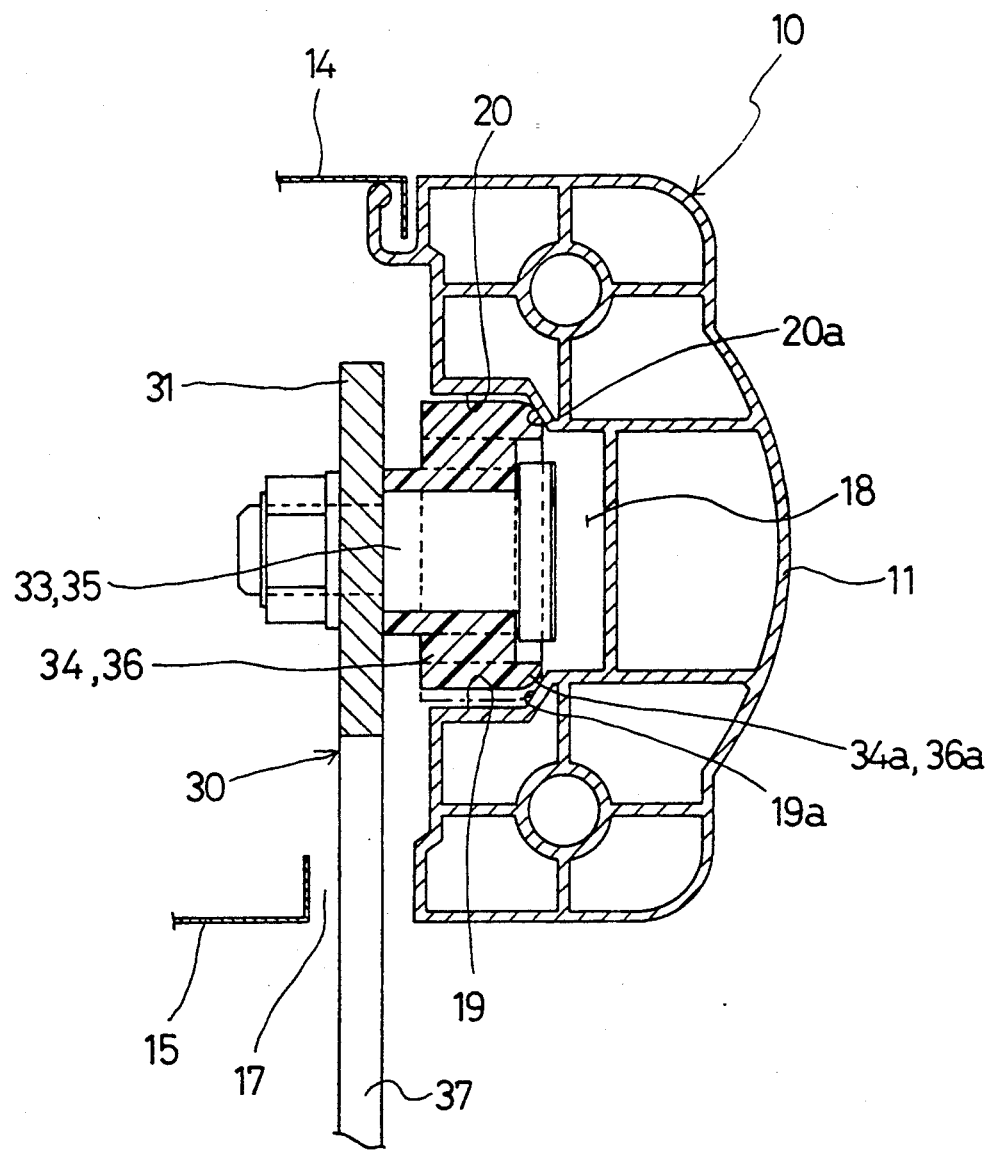
FIG. 7 is a top plan view in transverse section of a guide portion.
Figure 8:
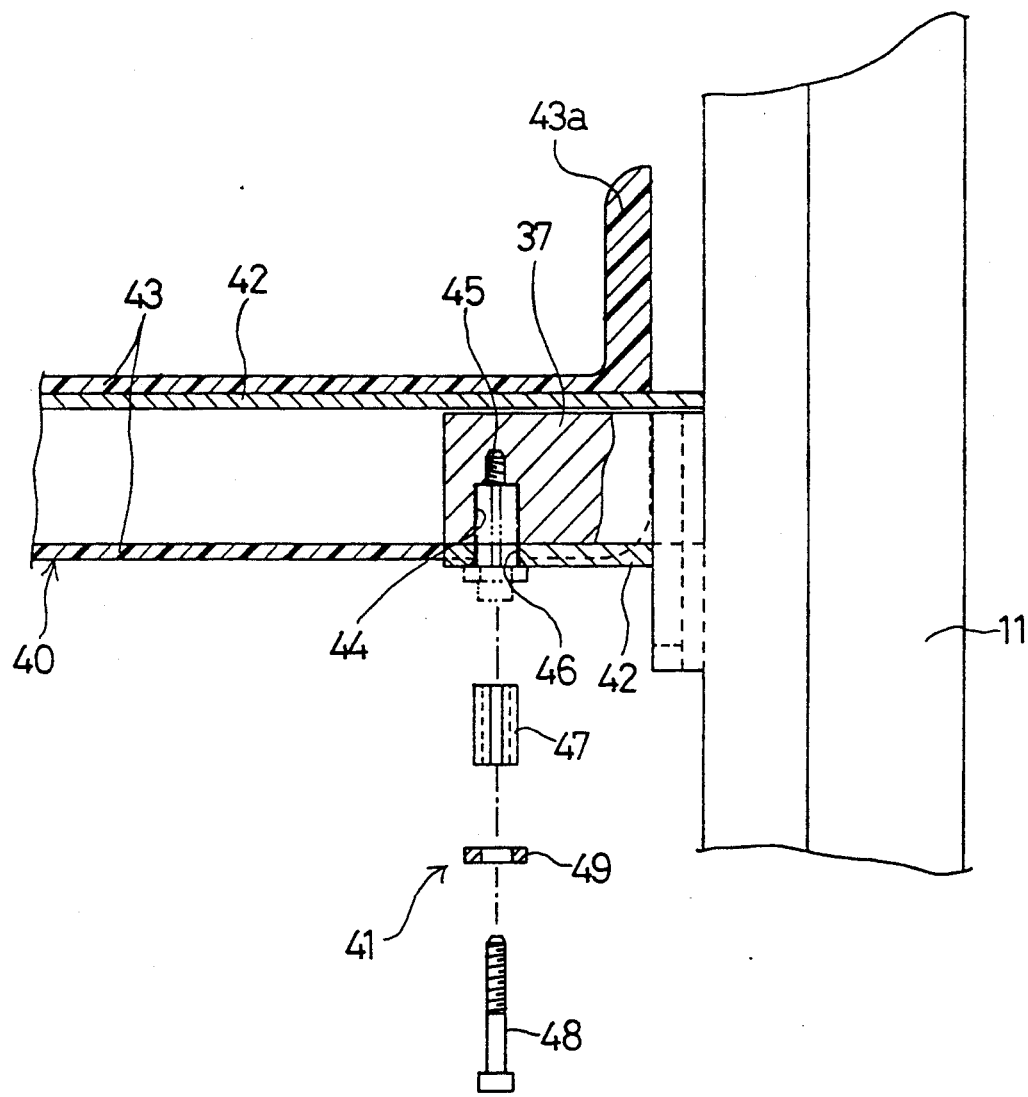
FIG. 8 is a vertical sectional view in side elevation of a connecting portion.
Figure 9:
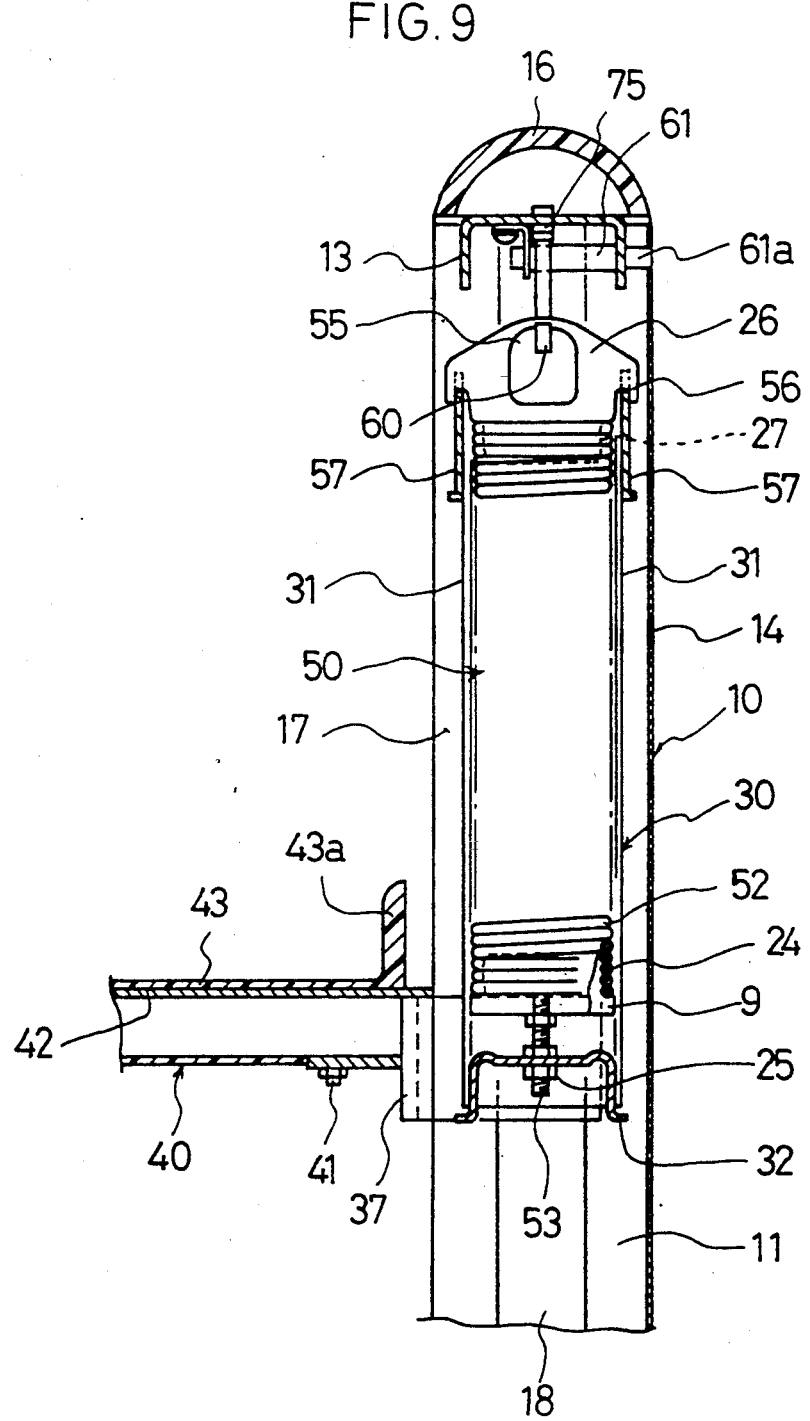
FIG. 9 is a vertical sectional view in side elevation of a modified form of the upward biasing device.
Figure 10:
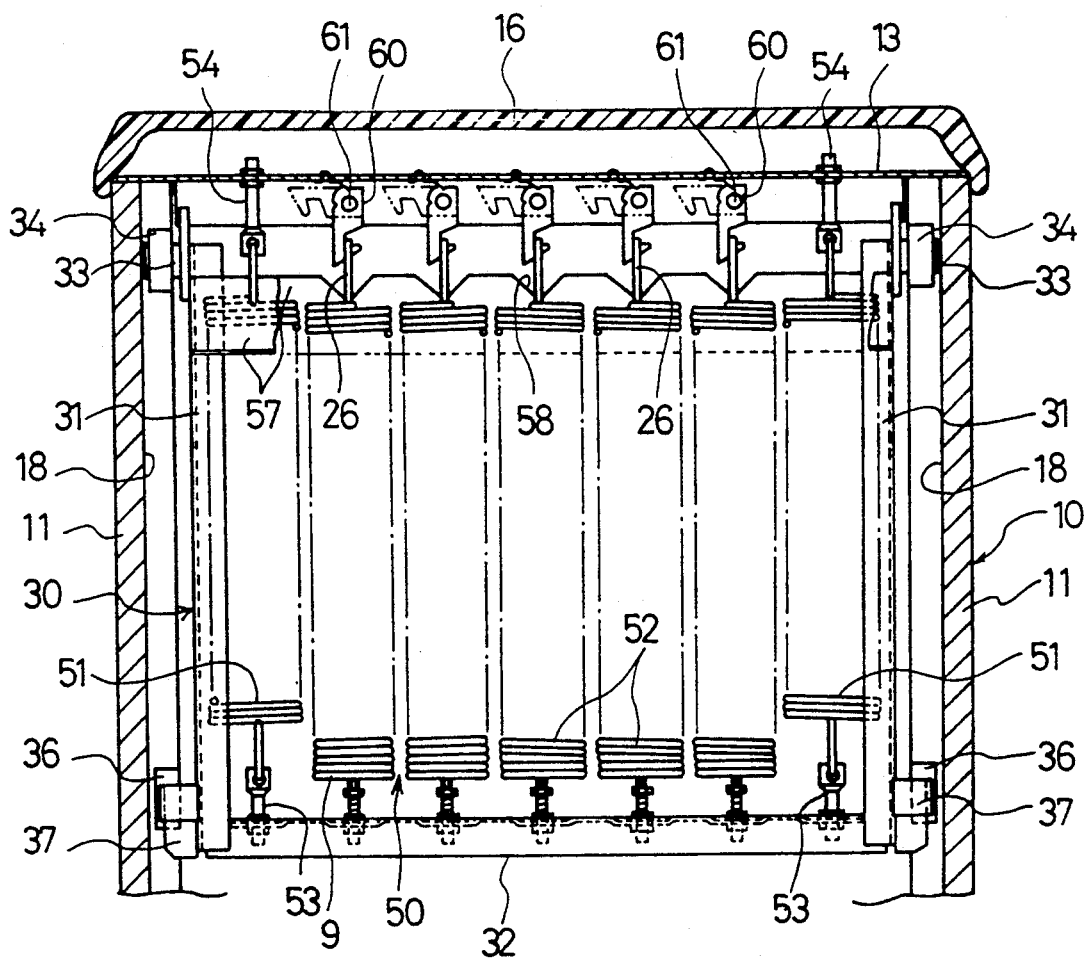
FIG. 10 is a partially cutaway front view of the modified form.
Figure 11:
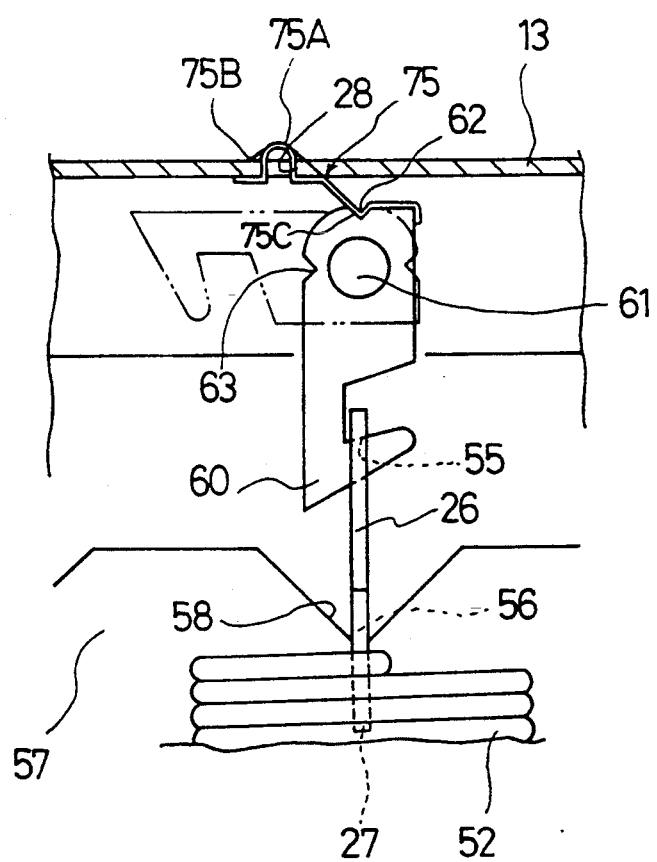
FIG. 11 is a fragmentary enlarged view in front elevation of the modification shown in FIG. 10.
Figure 12:
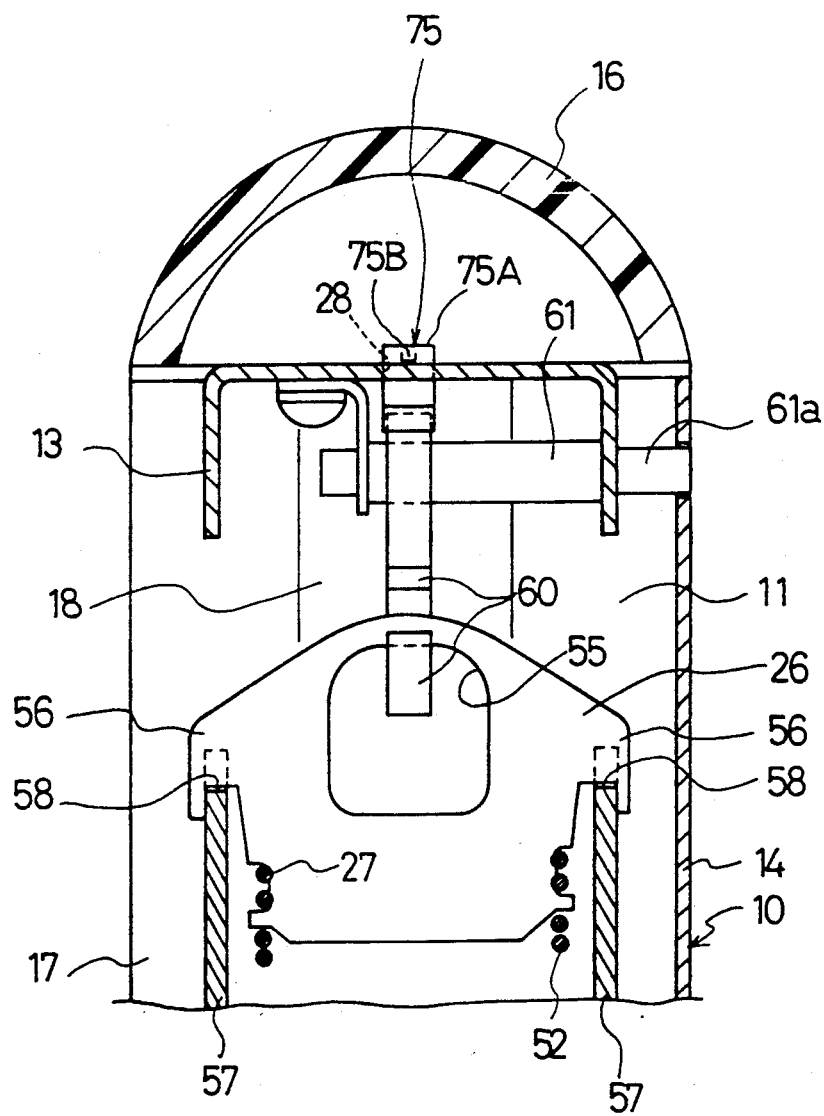
FIG. 12 is an enlarged side view of the like portion shown in FIG. 11.
Figure 13:
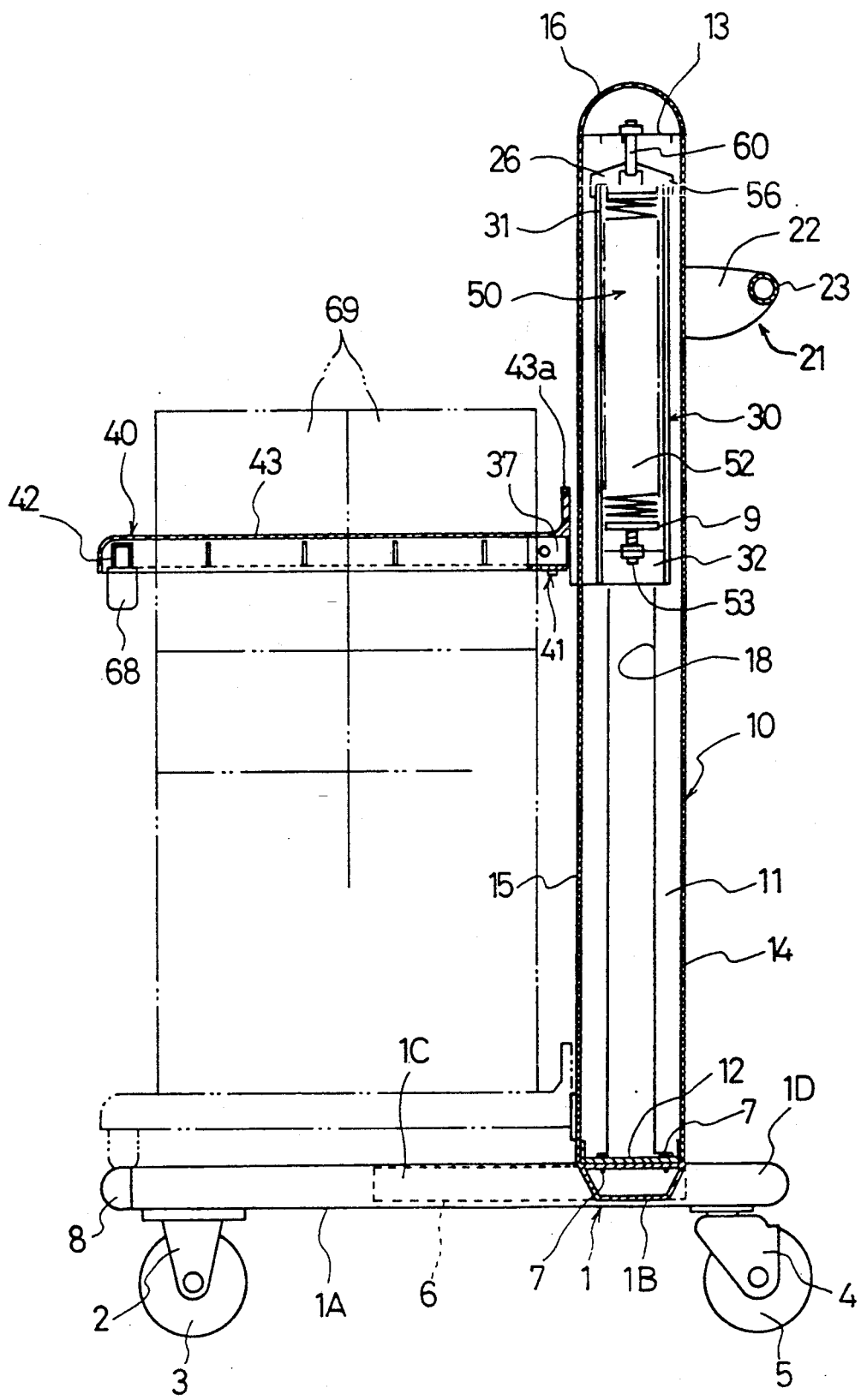
FIG. 13 is a partially cutaway general view in side elevation showing a truck incorporating the above modification.
Figure 14:
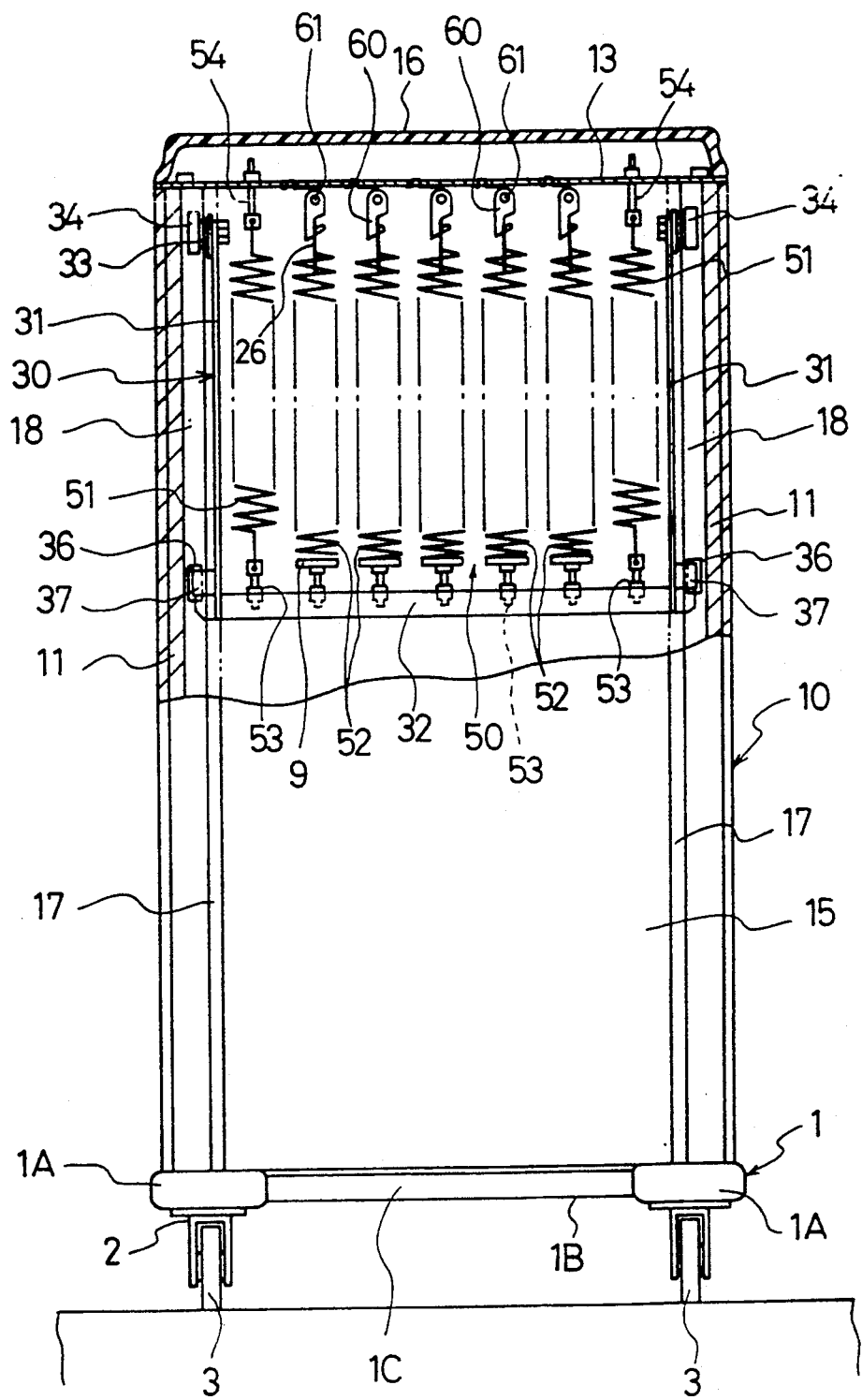
FIG. 14 is a partially cutaway general view in front elevation showing the truck incorporating the modification.

As FIG. 7 shows, the coupling elements 41 for fixing the table 40 to the connecting members 37 are in the form of bolts, and each connecting member 37 is formed with a first bolt-receiving hole 44 which is bottom-open, and a threaded hole 45 continued further inward of the first bolt-receiving hole 44. The reinforcing member 42 which is abuttable against the connecting members 37 from below is formed at each free end thereof with a second bolt-receiving hole 46 adapted to communicate with the corresponding first bolt-receiving hole 44. There is provided a roll pin 47 for insertion into the bolt-receiving holes 44, 46 as brought in communication with each other. This roll pin 47 is a single-split type cylindrical pin such that it is insertable into the bolt-receiving holes 44, 46 as it is diametrically contracted against its resiliency, so that when inserted in position, the roll pin 47 can closely fits the bolt-receiving holes 44, 46. There is provided a bolt 48 insertable into the roll pin 47 from below and threadingly engageable with the threaded hole 45. Shown by 49 is a washer.

As may be seen from FIGS. 1 to 6, an upward biasing device 50 for urging the carriage 30 to move in the upward direction is provided within the support member 10. More specifically, springs, as an example of resilient means acting to apply tensile force in the vertical direction, are laterally arranged in plurality (seven in the present embodiment) within the carriage 30. Of these springs, a pair of springs disposed at opposite ends, one at each end, serve as stationary springs 51 and the remaining five springs serve as changeover springs 52. The lower ends of the springs 51, 52 are connected to the lower frame 32 of the carriage 30 through boltand-nut type lower coupling elements 53 which are vertically position-adjustable. The upper ends of the pair of stationary springs 51 are connected to the upper beam 13 of the support member 10 through bolt-and-nut type upper coupling elements 54 which are vertically position-adjustable. It is noted in this connection that a control nut for each upper coupling element 54 is exposed above the upper beam 13.

A lower bracket 9 is fitted at the lower end of each changeover spring 52. The lower bracket 9 is elongate plate-shaped and has a pair of sides formed with recesses 24 for threadingly receiving the lower end portion of the changeover spring 52. The lower bracket 9 is coupled to the lower frame 32 of the carriage 30 by means of a nut 25 screwed on a bolt 53 extending downwardly from the lower bracket 9.

An upper bracket 26 is fitted to the upper end of each changeover spring 52. The upper bracket 26 has an umbrella-shaped plate-like configuration and has a pair of sides formed at a lower portion thereof with recesses 27 for threadingly receiving the upper end portion of the changeover spring 52.

An engaging element 60 has a hooked nose at one end and a hub portion at the other end. Because of the hub portion secured to a control pin 61, the engaging element 60 is pivotable about the axis of the control pin 61 for engagement with and disengagement from an engagement portion 55 of the upper bracket 26. A gripper means is arranged to resiliently engage with and disengage from locking recesses 62 and 63 formed in the hub portion of each engaging element 60. When the engaging element 60 is in an operative position shown with a solid line in FIG. 2, i.e., when the hooked nose falls in the hole 55 in the upper bracket 26 so as to couple the changeover spring 52 to the engaging element 60, the gripper means is engaged with the recess 62. When the engaging element 60 is in an inoperative position shown with a phantom line in FIG. 2, the gripper means is engaged with the recess 63. Between the upper ends of the side frames 31 there are disposed horizontal cross pieces 56 which are each larger than the depthwise length of the side frames 31. More specifically, each changeover spring 52 is provided at the upper end thereof with a cross piece 56 and an engagement portion 55 formed thereabove. Between the upper ends of the side frames 31 of the carriage 30 there are mounted a pair of holder plates 57, front and rear, with triangularly recessed holder portions 58 formed on each of the holder plates 57 and at same intervals as the changeover springs 52. The cross pieces 56 may be freely positioned over the space between the front and rear holder portions 58.

The engaging elements 60 can be engaged with and disengaged from the corresponding holes 55 only when the carriage 30 within the support member 10 is in its uppermost position. The control pins 61 extending depthwise of the upper beam 13 are pivotally mounted on the upper beam 13. The control pins 61 are exemplary of pivotal control means. One end of each control pin 61 which serves as a control portion 61a is exposed outside the support member 10. Locking elements 64, which afford a first example of the above described gripper means for positioning respective engaging elements 60 to the two positions, are provided on the upper beam 13. These locking elements 64 are of the spring plunger type such that a lock pin 65 is brought in engagement with the recess 62, 63 under the biasing force of a built-in spring.

The table 40 is provided on the underside of its front end with a stopper 68 which is abuttable against the upper surface of the side frame 1A when the table 40 has reached its lower limit of movement. Reference numeral 69 designates goods to be handled, which are formed by, for example, stacking a large number of cases containing articles in several tiers.

Reference will now be specifically made to the manner in which the above described embodiment is to be used.

FIGS. 1 to 4 show the condition in which all the engaging elements 60 are in their operative position. In this condition, goods 69 are placed on the table 40, whereupon the load of the goods is transmitted to the carriage 30 through the connecting members 37, etc. to cause the carriage 30 to be lowered against the elastic froce of the springs 51, 52. In this case, all the springs 51, 52 exert their action and, therefore, goods 69 of a maximum load can be handled. Where the goods are of the maximum load or in excess of the maximum load, the stopper 68 mounted to the underside of the table 40 at the front end thereof abuts the upper surface of the side frame 1A (see the phantom lines shown in FIG. 41), so that the load is dispersed and supported through the stopper 68 and connecting members 37.

As stated above, the truck on which goods 69 are supported is advanced by the operator exerting a push via the handgrip 21. For this purpose, a push can be performed by the operator while positioning his toes in the vicinity of the recess 1D formed at the rear side of the pedestal 1. The truck is moved backward when the operator pulls the truck via the handgrip while assuming a position fronting the direction of movement. For this purpose, a pull can be performed by the operator while positioning his heels in the vicinity of the recess 1D. Therefore, in both cases of pushing and pulling, the truck can be satusfactorily performed without the trouble of either foot striking against the pedestral 1.

After goods 69 are conveyed by the truck to a predetermined site, processing operation is carried out with articles taken out one by one or, alternatively, assembling work is carried out with the articles in combination with other articles. While such operation is carried out, the load of the goods 69 is gradually decreased and accordingly the carriage 30 is gradually elevated under the elastic force of the springs 51, 52. Thus, the top surface of the goods 69 (effective take-out surface) is maintained at a constant or substantially constant level. When the goods 69 on the table 40 are finally unloaded, as FIGS. 1 to 4 show, the table 40 is elevated to its upper limit of movement through the carriage 30.

As stated above, when the carriage 30 is positioned at its upper limit of movement, holder portions 58 at associated holder plates 57 abut respective cross pieces 56 from below thereby to slightly lift the engagement portions 55 into loose engagement with the complementary engaging elements 60 and for being supported by the holder portions 58. In this case, each lock pin 65 is in resilient engagement with the recess 62 of the complementary engaging element 60; therefore, the engaging element 60 is free from the possibility of being unexpectedly pivoted.

When the load of goods 69 to be handled is so light that not all the springs 51, 52 are required to be used, the number of springs in use is decreased when the goods 69 are in empty condition. That is, control pins 61 corresponding to the springs 52 to be switched over to non-use condition are pivotally moved by setting tools in the control portions 61a of the control pins 61. Through this procedure the corresponding lock pins 65 are retracted against the spring force and the engaging elements 60 are disengaged from the corresponding engagement portions 55. Thus, the engaging elements 60 are horizontally positioned as shown in phantom in FIG. 2. In this case, each of th lock pins 65 goes into resilient engagement with the other recess 63 so that the corresponding engaging element 60 is maintained in its horizontal position. The upper ends of those springs 52 which have been switched over to non-use condition are held in orderly manner through the holder plates 57 as stated earlier.

In this way, the number of springs 52 in active use can be changed according to the maximum load of goods 69 to be handled.

The above described upward and downward movement of the carriage 30 is carried out on and along a predetermined path by the guide rollers 34, 36 being guided in the guide grooves 18. In this case, the upper guide rollers 34 are guided by the front guide faces 19 (FIG. 7), and the lower guide rollers 36 are guided by the rear guide faces 20, through a bias load applied to the table 40.

The carriage 30 is positionally regulated in the transverse direction since the arcuate faces 34a, 36a of the guide rollers 34, 36 go into abutment with the inclined surfaces 19a, 20a.

If bolts 48 used for coupling the connecting members 37 to the table 40 should become loose and even slip off in the course of use, the connection between the connecting members 37 and the table 40 can be maintained in order by virtue of the roll pins 47 fitted in the bolt receiving holes 44, 46 and held in resilient engagement. Hence, there is no possibility of the table 40 being disengaged to fall upon slipping off of the bolts 48, and a fallen bolt 48 does not immediately lead to a serious accident.

According to the above described arrangement, it is possible to increase or decrease the number of operative springs 52 in a simple and easy manner by manipulating the exposed control portions 61a as required. Thus, necessary adjustment can be quickly carried out in response to any change in the maximum load of goods to be handled.

FIGS. 9 through 14 show a modified form of the upward biasing device 50 shown in FIGS. 1 through 6. The modified form is different from the device shown in FIGS. 1 to 6 in that positioning spring elements 75 for resiliently positioning the engaging elements 60 to two positions through pivotal movement thereof are disposed on the upper beam 13. These positioning spring elements 75 are formed by deforming leaf springs. Each spring element 75 comprises an upwardly curved portion 75A formed at one longitudinal end which is insertable from below into a rectangular aperture 28 formed in the upper beam 13, the curved portion 75A being formed with a slip-off preventing burr 75B. The other longitudinal end of the spring element 75 is set away from the underside of the upper beam 13, and a downward lobe 75C is formed centrally of the other longitudinal end portion, which lobe 75C is engageable by the recesses 62, 63.

Figure 15:
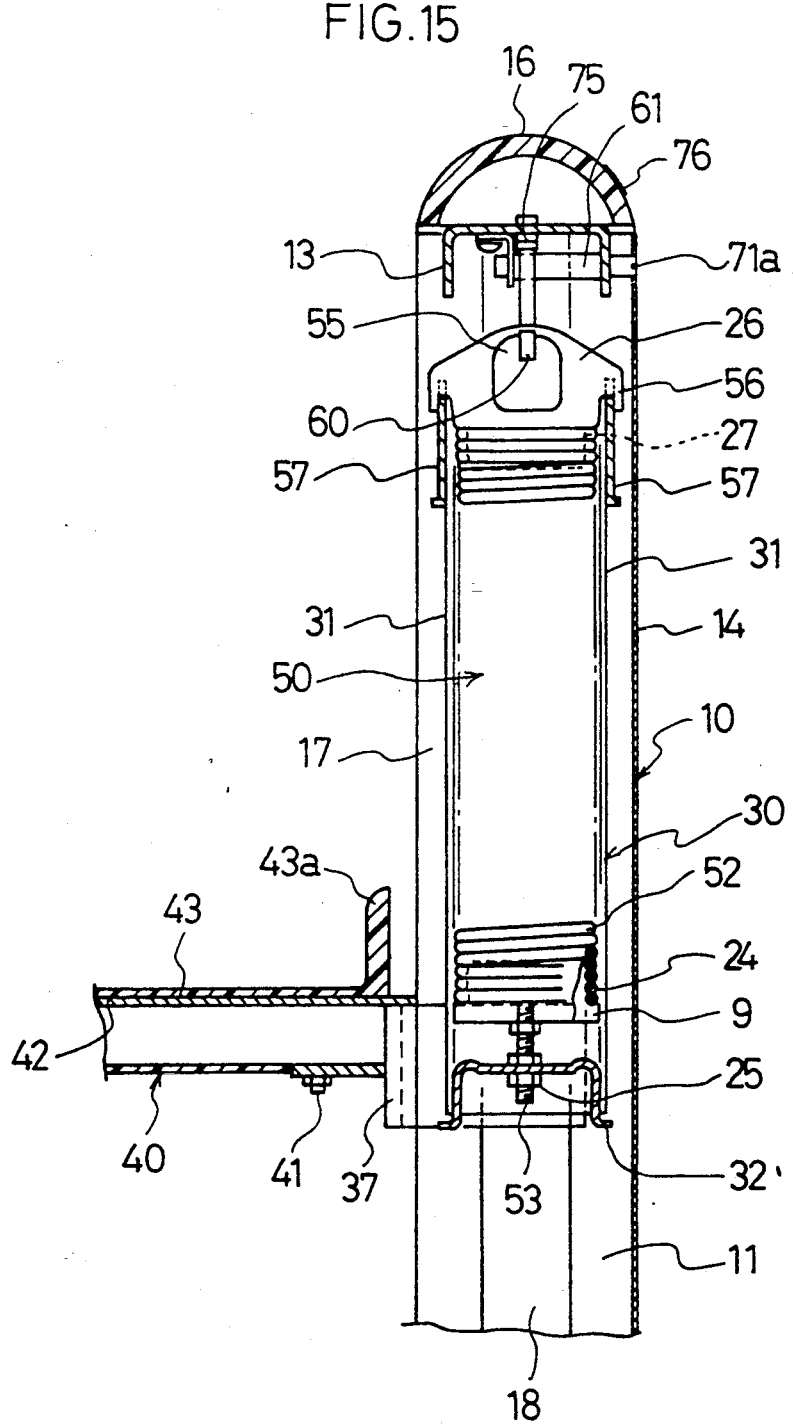
FIG. 15 is a vertical sectional side view of another modified form of the upward biasing device.
Figure 16:
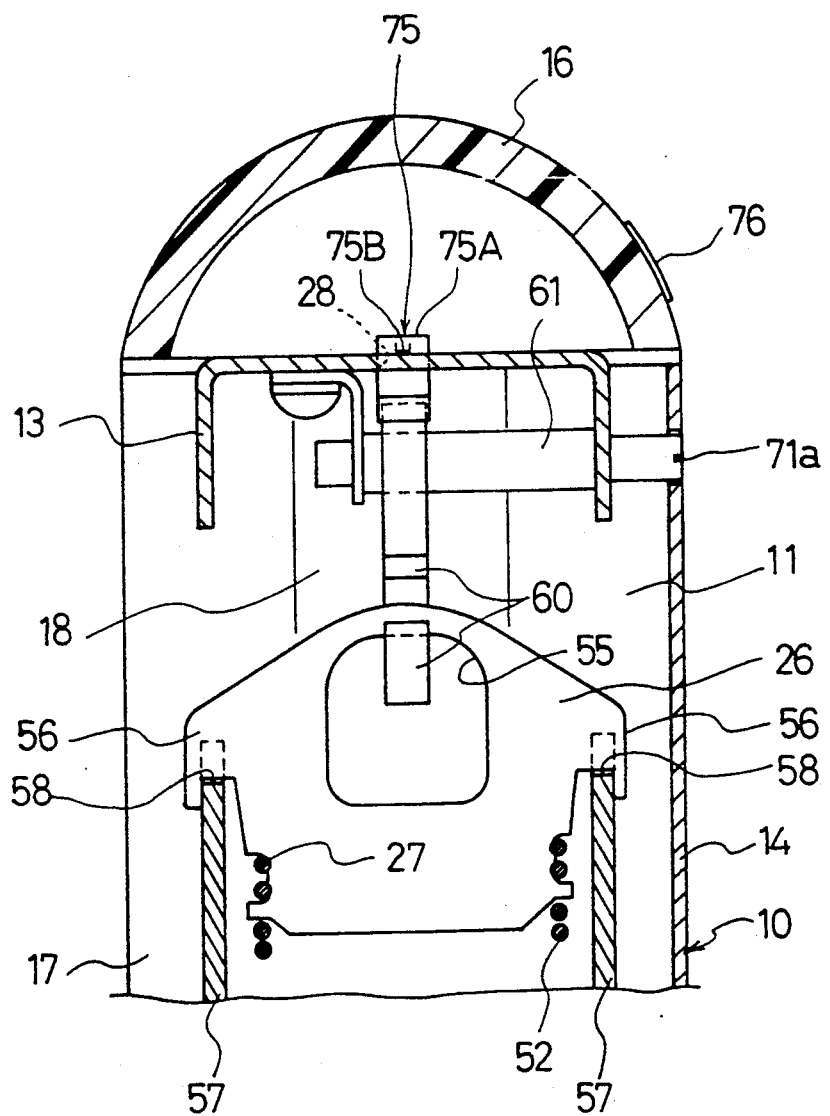
FIG. 16 is a fragmentary enlarged side view of the modification shown in FIG. 15.
Figure 17:
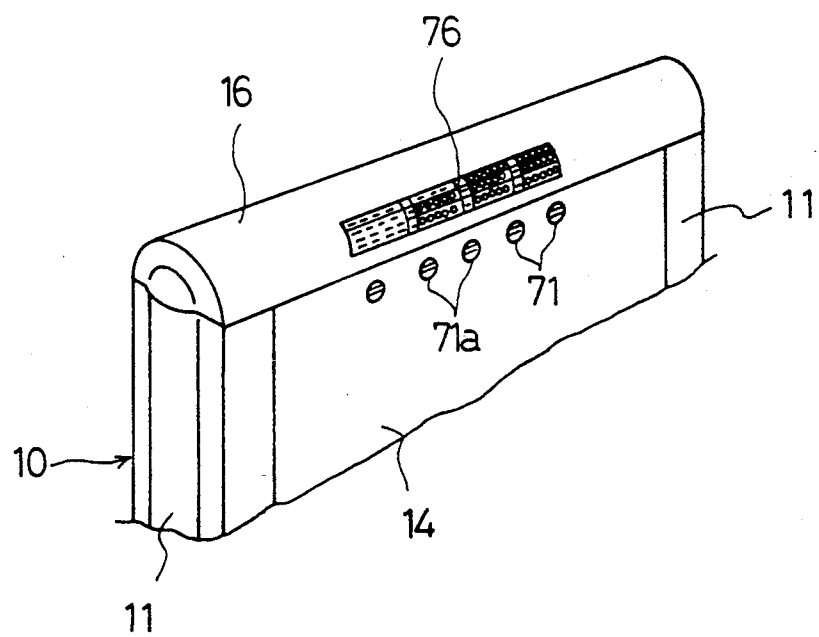
FIG. 17 is a perspective view of the portion shown in FIG. 16.

FIGS. 15 to 17 show another modified form of the upward biasing device 50 which comprises a longitudinal groove 71a formed in the end of each control pin 61 exposed outside the support member 10, the groove 71a serving as an engagement/disengagement marker. A coin or a similar tool is insertable into the longitudinal groove 71a.

When goods 69 to be handled are so light that not all the springs 52 are required to be used, the number of springs to be used is decreased after the table 40 is emptied. The operator can find a suitable combination of springs 52 matching the weight of the goods 69 to be handled if only he consults a sticker 76 stuck on the top cover 16. A file which can be carried around by the operator may be substituted for the sticker 76.

Figure 2:
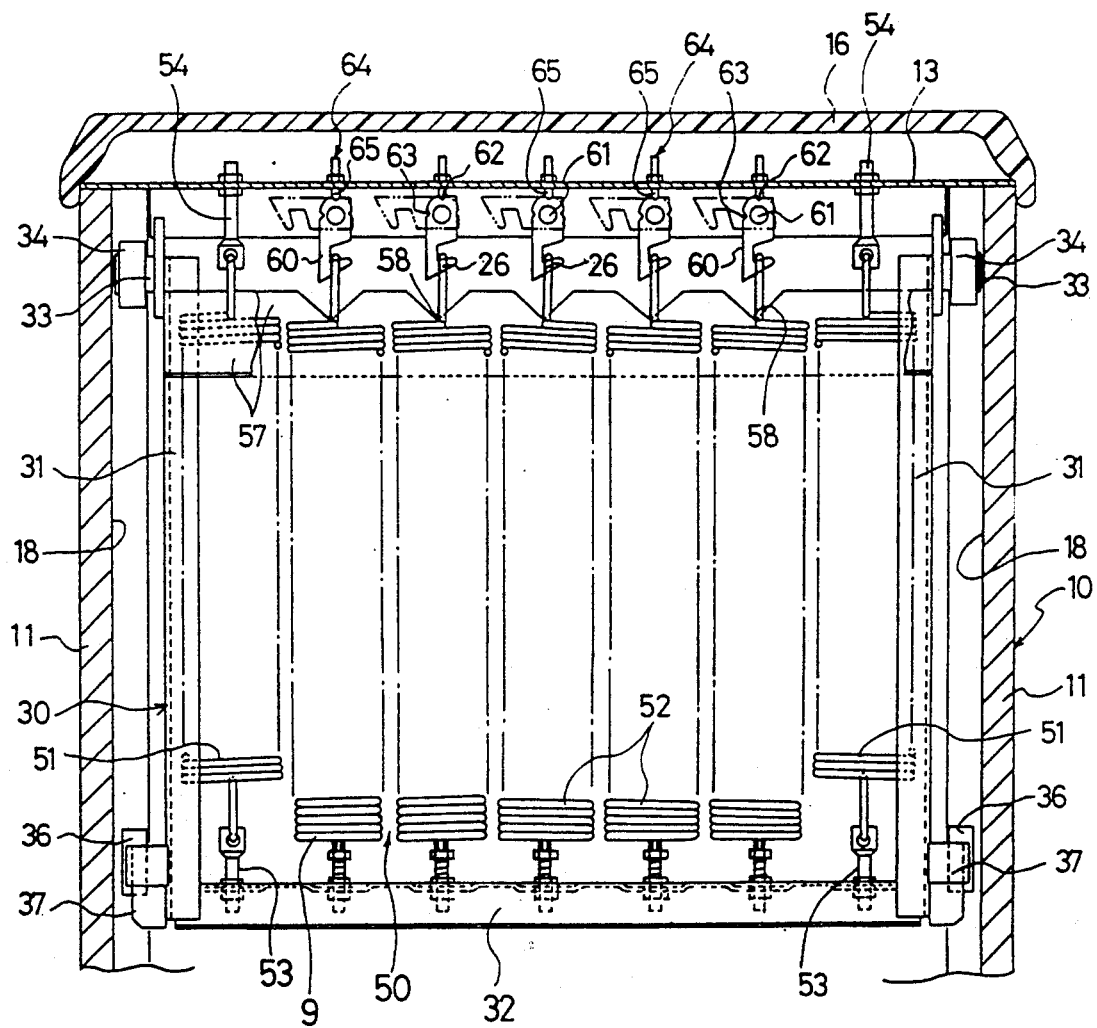
FIG. 2 is a partially cutaway front view thereof.
Figure 3:
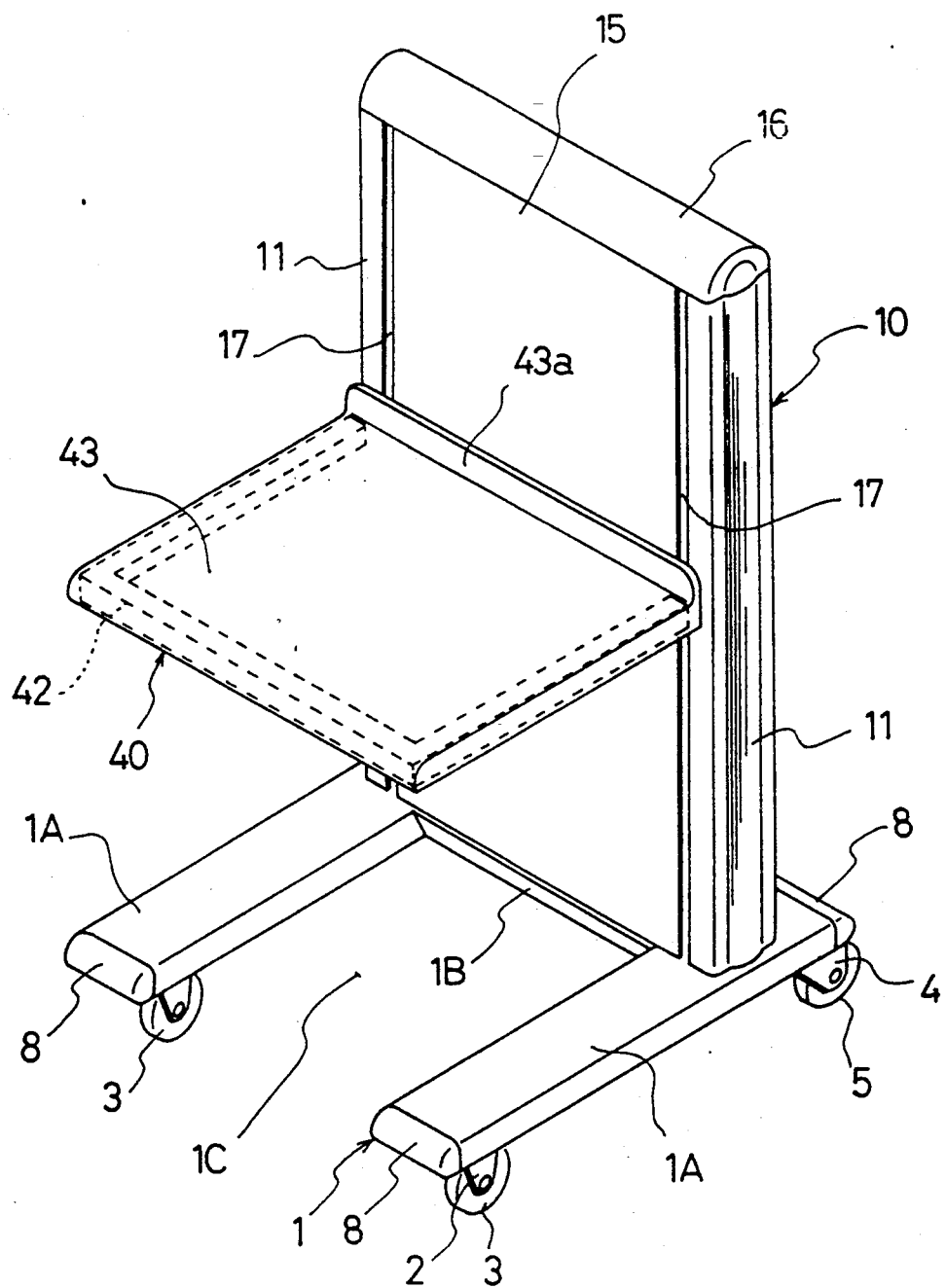
FIG. 3 is a general view in perspective of a truck.
Figure 4:
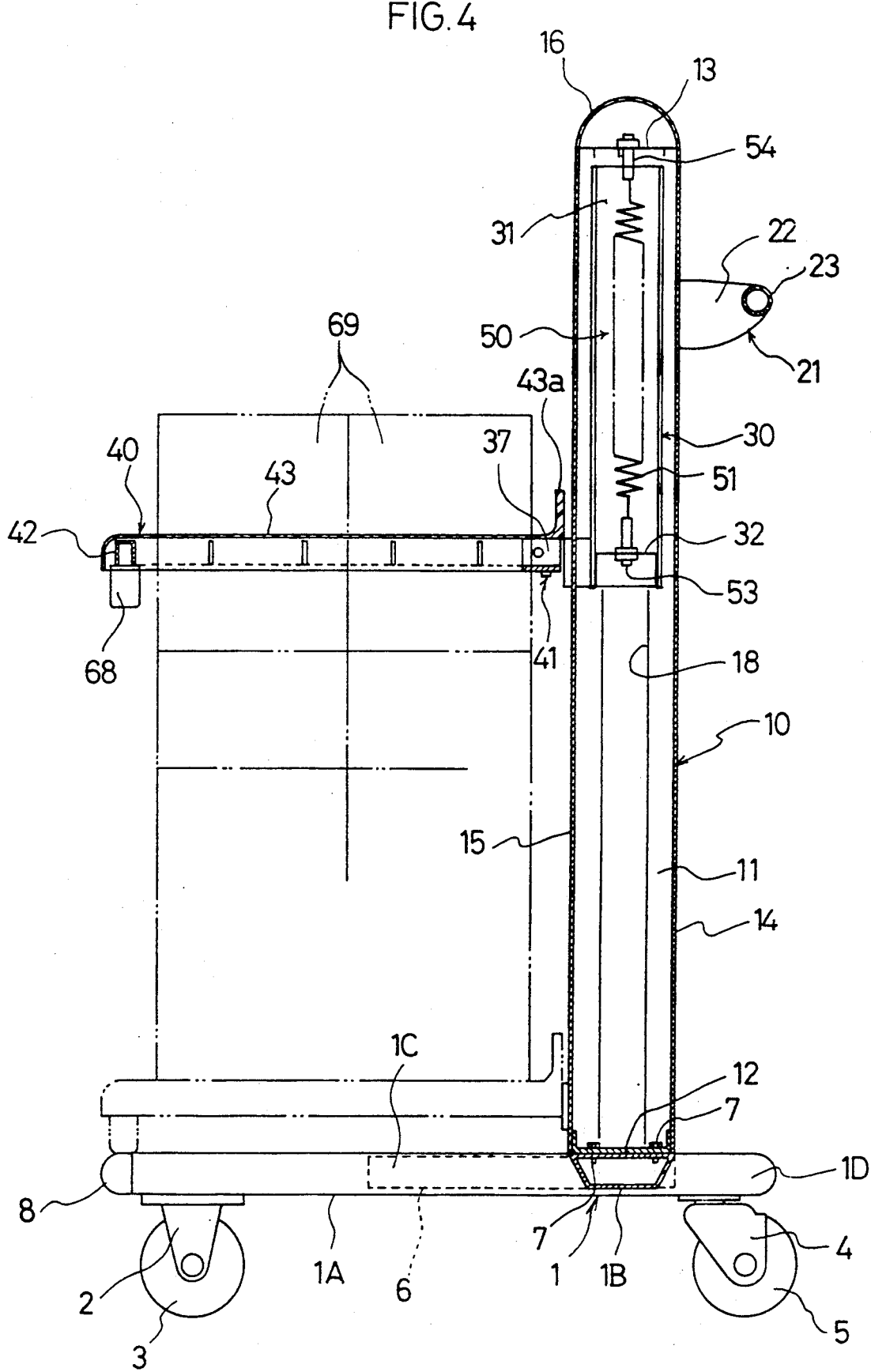
FIG. 4 is a partially cutaway side view thereof.
Figure 5:
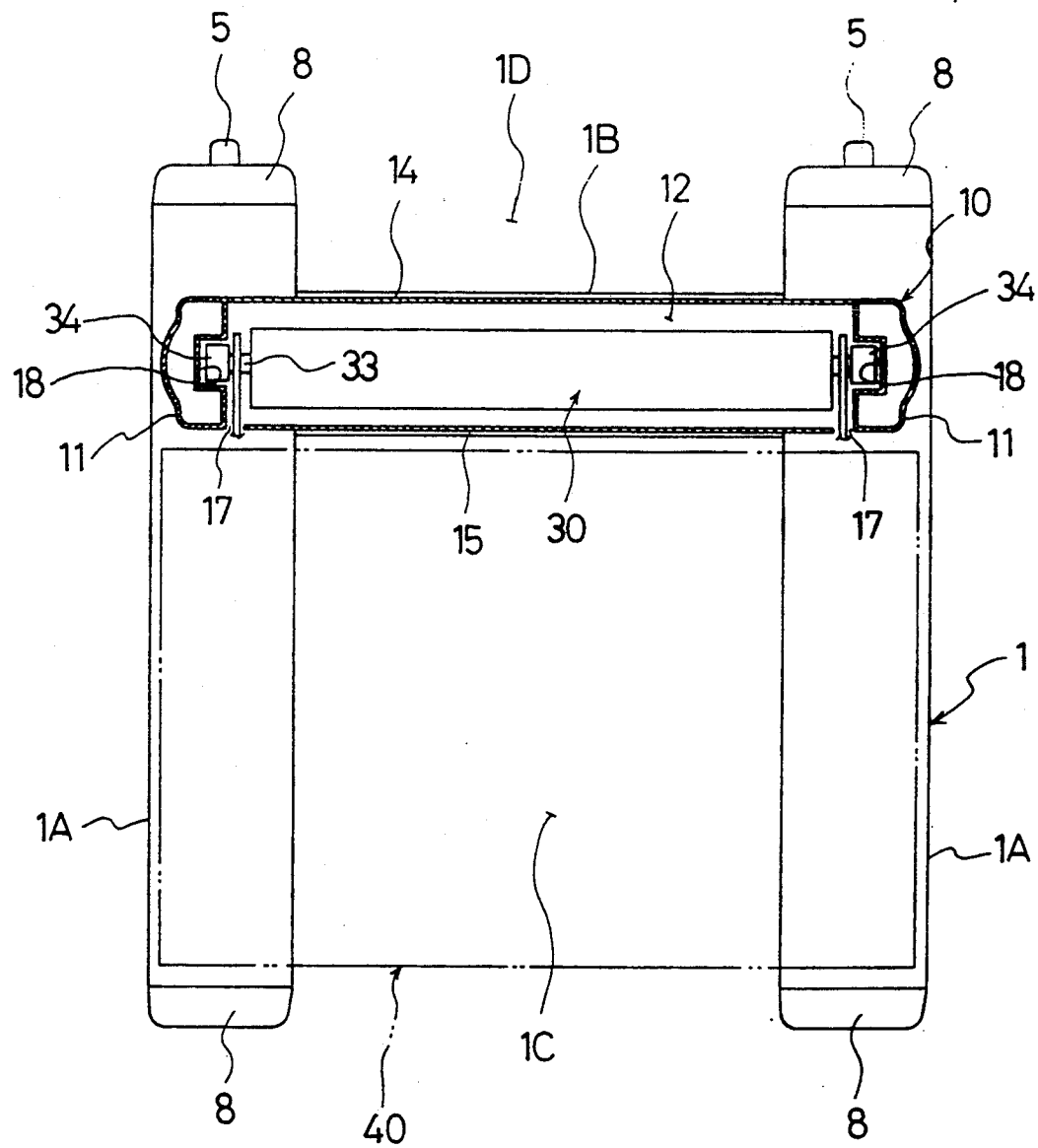
FIG. 5 is a top plan view in transverse section thereof.
Figure 6:
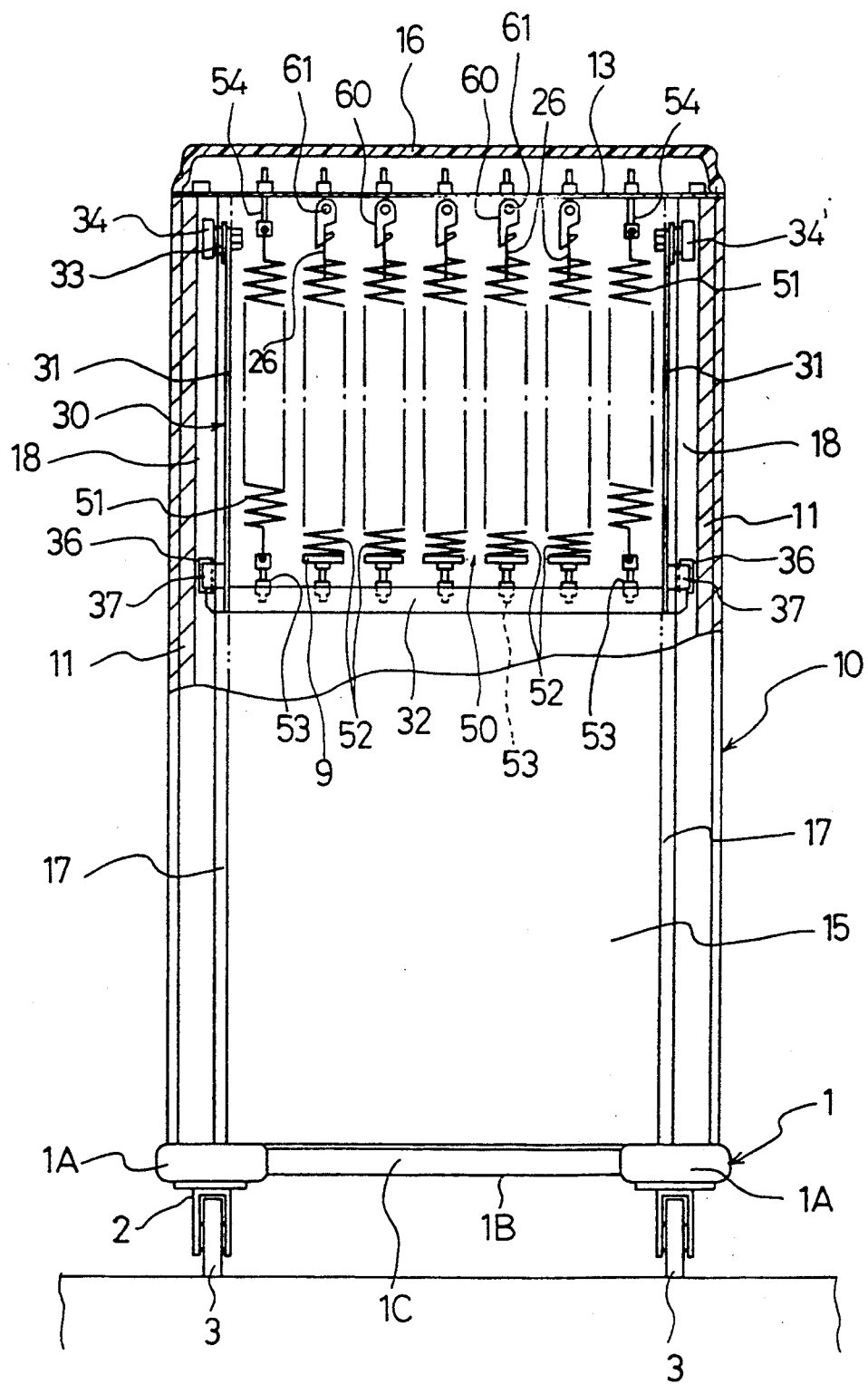
FIG. 6 is a partially cutaway front view thereof.

Each of the engaging elements 60 corresponding to the springs 52 thus found is pivoted downwardly from the horizontally extending position, as shown in phantom lines in FIG. 2, to the solid line position shown in that figure. It will be noted that, when an engaging element 60 is pivoted downwardly, it is engaged with a hole 55 for a corresponding spring 52. Downward pivotation of each engaging element 60 is accomplished by means of a coin or other suitable tool inserted into one groove 71a (FIG. 15) after another.

In this way, the number of springs in use can be changed according to the change in the maximum load of goods 69 to be handled. Conversely, the weight of goods 69 on the table 40 is known by checking the angular positions of the grooves 71a against the sticker 76.

It will also be noted that, in the guide device according to the invention, the guide rollers are guided along the front and rear surfaces defining the guide grooves, whereby forwardly and backwardly positioned vertical movement of the table can be effectively performed, and the outer circumferential edges of the guide rollers are adapted to abut the inclined surfaces, whereby transversely positioned vertical movement of the table can also be effectively performed. In this manner, the guide rollers can be used for such combined guiding purposes, and there is no necessity for providing additional structural members for particular use in mounting the guide rollers.

What is claimed is:

1. A truck having a vertically movable goods-receiving portion comprising a support member mounted on a wheeled pedestal, a vertically movable carriage provided in the support member, a table mounted on the carriage, a plurality of resilient elements arranged between an upper portion of the support member and the carriage, the lower ends of said resilient elements being connected to the carriage, some of said resilient elements being connected at their upper ends to said support member, the remaining resilient elements being individually provided at their upper ends with cross pieces and engagement pieces positioned above the respective cross pieces, a holder portion provided on the top of the carriage for holding said cross pieces from below, a plurality of engaging elements pivotally attached to said support member which are individually engageable with and disengageable from said engagement pieces, and control elements for pivoting said engaging elements.

2. A truck having a vertically movable goods-receiving portion as set forth in claim 1, further comprising locking means for locking said engaging elements in one of a plurality of positions when said engaging elements have been pivoted, an end face of each of said control elements being exposed to the outside of said support member.

3. A truck having a vertically movable goods-receiving portion as set forth in claim 1, further comprising spring means for locking said engaging elements in one of a plurality of positions when said engaging elements have been pivoted, an end face of each of said control elements being exposed to the outside of said support member.

4. A truck having a vertically movable goods-receiving portions as set forth in claim 2, wherein a groove is formed in said end face of each of said control elements exposed outside the support member, and a reference table indicating a variety of combinations of resilient elements to be placed in operative position according to the weight of goods to be handled.

5. A truck having a vertically movable goods-receiving portion as set forth in claim 3, wherein a groove is formed in said end face of each of said control elements exposed outside the support member, and a reference table indicating a variety of combinations of resilient elements to be placed in operative position according to the weight of goods to be handled.

6. A truck having a vertically movable goods-receiving portion as set forth in claim 1, further characterized in that said pedestal comprises a pair of side frames each having front and rear wheels and a transverse frame interconnecting said side frames at the rear end portions thereof, said support member extends vertically from said transverse frame and transversely to the outer edges of said side frames, and a handgrip is fitted to a back of said support member.

7. A truck having a vertically movable goods-receiving portion as set forth in claim 1, further characterized in that said support member includes a pair of transversely spaced opposite posts having surfaces facing each other and formed with guide grooves respectively, each of said guide grooves is defined by a pair of guide faces having convergently extending interior portions, said carriage carries two pairs of upper and lower guide rollers arranged to ride on said guide faces, said two pairs being disposed one at each transverse end of said carriage, and a portion of each of said guide rollers is adapted to come in contact with either of said convergently extending interior portions of said guide faces and is of arc-shaped cross-section.

* * * * *